United States Patent [19]

Lagree et al.

[11] Patent Number: 4,810,265
[45] Date of Patent: Mar. 7, 1989

[54] PRESSURE SWING ADSORPTION PROCESS FOR GAS SEPARATION

[75] Inventors: Dale A. Lagree, Williamsville; Frederick W. Leavitt, North Tonawanda, both of N.Y.

[73] Assignee: Union Carbide Corporation, Danbury, Conn.

[21] Appl. No.: 139,207

[22] Filed: Dec. 29, 1987

[51] Int. Cl.[4] .............................................. B01D 53/04
[52] U.S. Cl. ........................................ 55/26; 55/31;
55/33; 55/58; 55/62; 55/68; 55/75
[58] Field of Search ............... 55/25, 26, 31, 33, 58,
55/62, 68, 75, 179, 389

[56] References Cited

U.S. PATENT DOCUMENTS

| | | | |
|---|---|---|---|
| 2,882,244 | 4/1959 | Milton | 55/75 X |
| 3,564,816 | 2/1971 | Batta | 55/26 |
| 3,636,679 | 1/1972 | Batta | 55/26 |
| 3,738,087 | 6/1973 | McCombs | 55/62 |
| 3,796,022 | 3/1974 | Simonet et al. | 55/25 |
| 3,797,201 | 3/1974 | Tamura | 55/62 |
| 4,013,429 | 3/1977 | Sircar et al. | 55/33 |
| 4,070,164 | 1/1978 | Miwa et al. | 55/26 |
| 4,129,424 | 12/1978 | Armond | 55/25 |
| 4,144,037 | 3/1979 | Armond et al. | 55/58 |
| 4,168,149 | 9/1979 | Armond et al. | 55/58 X |
| 4,264,340 | 4/1981 | Sircar et al. | 55/25 |
| 4,329,158 | 5/1982 | Sircar | 55/26 |
| 4,359,328 | 11/1982 | Wilson | 55/26 |
| 4,371,380 | 2/1983 | Benkmann | 55/26 |
| 4,431,432 | 2/1984 | Amitani et al. | 55/26 |
| 4,482,361 | 11/1984 | Whysall | 55/26 |
| 4,512,780 | 4/1985 | Fuderer | 55/26 |
| 4,578,089 | 3/1986 | Richter et al. | 55/26 |
| 4,589,888 | 5/1986 | Hiscock et al. | 55/26 |
| 4,599,094 | 7/1986 | Werner et al. | 55/26 |
| 4,636,226 | 1/1987 | Canfora | 55/75 X |
| 4,705,541 | 11/1987 | Sircar | 55/26 |

Primary Examiner—Robert Spitzer
Attorney, Agent, or Firm—Alvin H. Fritschler

[57] ABSTRACT

An improved pressure swing adsorption process enables the more readily adsorbable component of a feed gas to be economically recovered, e.g. nitrogen from air. The more readily absorbable component is used as copurge at upper adsorption pressure, and less readily adsorbable component is used for countercurrent purge at subatmospheric desorption pressure and for initial repressurization in a countercurrent backfilling step.

20 Claims, 1 Drawing Sheet

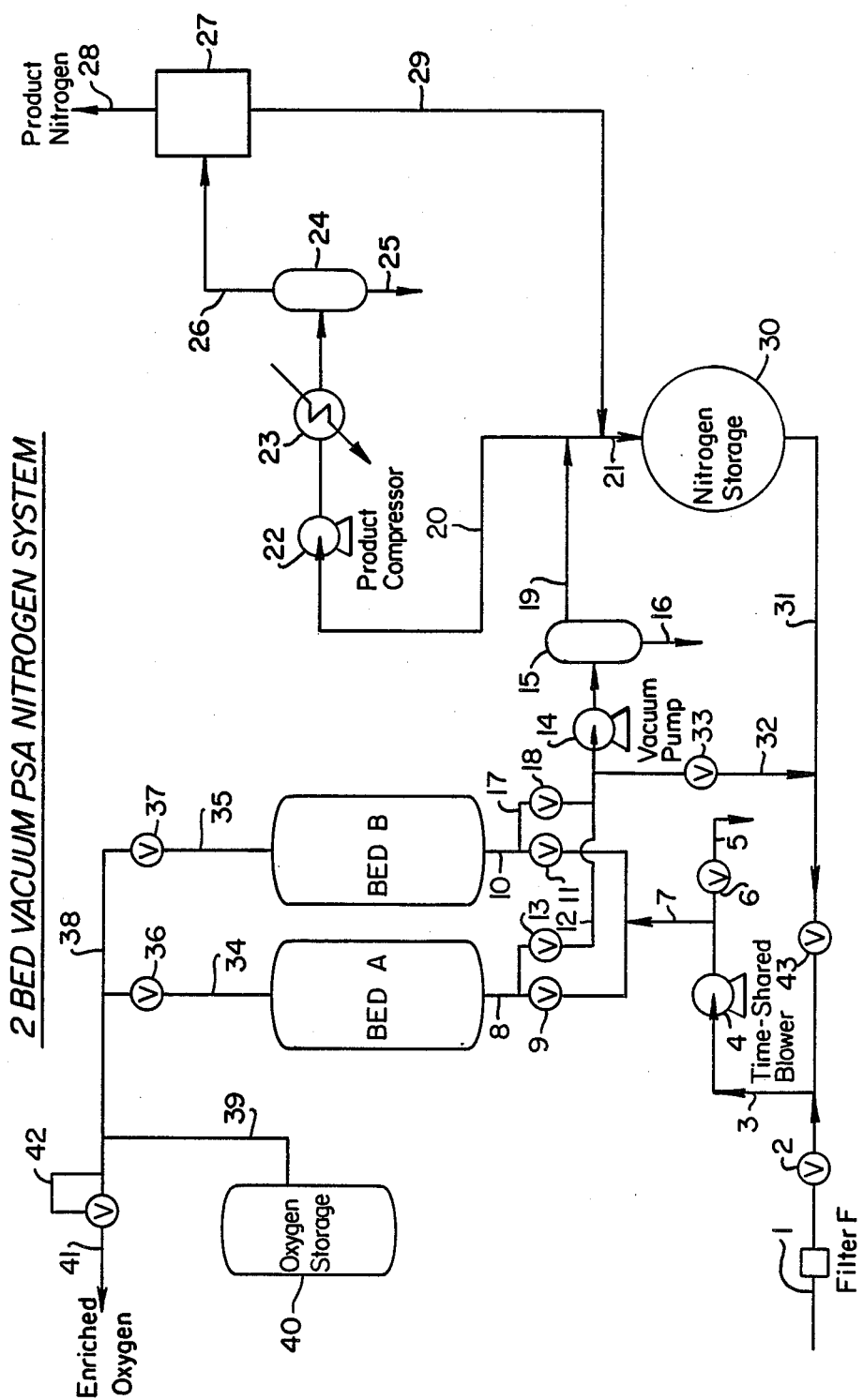

PRESSURE SWING ADSORPTION PROCESS FOR GAS SEPARATION

BACKGROUND OF THE INVENTION

1. Field of the Invention

The invention relates to the recovery of the more readily adsorbable component of a gas mixture, particularly the recovery of nitrogen from air. More particularly, it relates to the recovery of nitrogen from air using an improved pressure swing adsorption process and apparatus.

2. Description of the Prior Art

In numerous chemical processing, refinery, metal production and other industrial applications, high purity nitrogen is desired for purging, blanketing, the providing of metal treating atmospheres, and the like. Enriched oxygen gas is also frequently required for various purposes in the same facility. Nitrogen and oxygen can, of course, be obtained by various known techniques for air separation. Pressure swing adsorption (PSA) processing is particularly suited for such air separation in a variety of applications, particularly in relatively small sized operations for which the use of a cryogenic air separation plant may not be economically feasible. Typical applications of this type require purities in the range of 95.0-99.9% nitrogen at flow rates of up to 100,000 cubic feet per hour.

In the PSA process, a feed gas mixture containing a more readily adsorbable component and a less readily adsorbable component are commonly passed to an adsorbent bed capable of selectively adsorbing the more readily adsorbable component at a higher adsorption pressure. The bed is thereafter depressured to a lower desorption pressure for desorption of said more readily adsorbable component and its removal from the bed prior to the introduction of additional quantities of the feed gas mixture to the bed as cyclic adsorption-desorption operations are continued in said bed. As those skilled in the art will readily appreciate, the PSA process is commonly employed in multi-bed systems, with each bed employing the PSA processing sequence on a cyclic basis interrelated to the carrying out of such processing sequence in the other beds in the system.

As applied for air separation purposes, PSA systems achieve the desired separation of oxygen and nitrogen because of the greater selectivity of the adsorbent employed for either oxygen or nitrogen. The adsorptive capacity of the particular adsorbent material employed increases at higher pressure levels and decreases at lower pressures. In PSA processes and systems for the production of high purity nitrogen product, the adsorbent employed may be one having a greater selectivity for either the desired nitrogen product or for oxygen. In systems in which the adsorbent employed is an oxygen selective material, such as carbon molecular sieves, the product nitrogen is produced as the less readily adsorbable component during the passage of feed air to bed of adsorbent at a higher adsorption pressure. In systems in which the adsorbent employed is a nitrogen selective material, such as zeolite molecular sieves, the product nitrogen is produced as the more readily adsorbable component upon the depressurization of the adsorbent bed to its lower desorption pressure.

There have been numerous attempts to enhance the PSA process and system, particularly to lower capital costs, increase reliability and minimize operating costs, as by achieving relatively low power consumption per unit of product being produced. One desirable goal in the achieving of such overall objectives is to enable the production of relatively high purity coproduct in addition to the desired high purity product. As applied to air separation and other gas separation operations, the Batta patent, U.S. Pat. No. 3,636,679, discloses a PSA cycle as applied to two or more beds wherein each bed is partially repressurized from a lower desorption pressure by simultaneous feed gas-product gas introduction from opposite ends of the bed followed by further repressurization to higher adsorption pressure by feed gas alone, after which the bed is cocurrently depressurized with release of less readily adsorbable component from the discharge end thereof, a portion thereof being recovered as product gas and the remainder being used for pressure equalization and providing purge gas to another bed or beds in the system. The bed is then countercurrently depressurized with release of gas from the feed end of the bed and purged prior to commencing partial repressurization using additional feed gas as cyclic operations are carried out on a continuous basis. The approach of this patent has been successfully employed in air separation operations intended to recover product oxygen as the less readily adsorbable component of air. The Batta process is not applicable, however, to the recovery of the more readily adsorbable component of air, e.g., nitrogen, as the desired high purity product gas.

Various other processes exist, however, in which it is desired to recover the more readily adsorbable component as product gas. Such processes commonly employ a vacuum cycle in which the more readily adsorbable component of the gas mixture is desorbed from the bed at a subatmospheric desorption pressure. Thus, the Tamura patent, U.S. Pat. No. 3,797,201, discloses an air separation process that includes the introduction of air at atmospheric adsorption pressure into an adsorbent bed capable of selectively adsorbing the more readily adsorbable nitrogen component thereof, followed by vacuum desorption to recover said nitrogen as desired product gas. To increase the purity of the product nitrogen, Tamura teaches the carrying out of the initial adsorption step with release of oxygen-rich gas from the discharge end thereof until breakthrough of the nitrogen adsorption front at said discharge end of the bed and the incorporation of a cocurrent purge at said higher adsorption pressure, using nitrogen for purge, prior to countercurrent vacuum desorption and repressurization. The application of this process tends to be limited by the unavailability of coproduct oxygen at a useable pressure and in an energy efficient manner, although high purity nitrogen product can be obtained thereby. A similar processing cycle is described in the Sircar et al. patents, U.S. Pat. Nos. 4,013,429 and 4,264,340, said cycle employing two adsorption trains, each consisting of a pretreatment bed and a main separation bed, together with variable volume surge tanks to accommodate discontinuous flow rates between processing steps. The high degree of vacuum required during desorption and the overall complexity of the process, however, serve to add significantly to the equipment and power costs associated with this process.

Vacuum desorption is likewise employed in the process of the Miwa et al. patent U.S. Pat. No. 4,070,164, which includes pretreatment for cleaning and drying air and a processing cycle that includes (1) pressurization of a bed to about 4 atm by air feed, (2) cocurrent purge at said elevated pressure with nitrogen to remove an oxygen rich stream from the discharge end of the bed, (3) countercurrent depressurization of nitrogen rich gas from the feed end of the bed, and (4) vacuum desorption to about 0.3 atm with release of additional nitrogen-rich gas from said feed end of the bed. By the combining of gas released during the two countercurrent depressurization steps, a constant flow of high purity nitrogen is recovered from the system, although the recovery level for the desired nitrogen is quite low using this approach. Both capital and operating costs are relatively high for this processing cycle carried out in four bed systems. Capital costs are high because of the use of four adsorbent vessels, with associated valve, compression equipment and other requirements. Operating costs tend to be high because of the relatively low efficiency of the process. The same four processing steps were also disclosed in the Armond patent, U.S. Pat. No. 4,129,424, which also provides for the cocurrent purge step to be carried out at a pressure substantially equal to the partial pressure of the nitrogen in the feed gas, thereby significantly reducing the amount of purge gas required to saturate the bed as compared with similar processes in which purging is carried out at a higher pressure. This, in turn, leads to the inclusion of a cocurrent venting step after air feed introduction to reduce the pressure of the bed to that of the purge gas.

The art of recovering high purity nitrogen from air by use of PSA processing was advanced by the improved process disclosed in the Werner et al. patent, U.S. Pat. No. 4,599,094. This process includes the steps of (1) pressurization, (2) copurge, and (3) countercurrent depressurization to a lower subatmospheric desorption pressure, with the recovery and purity of nitrogen as the more readily adsorbable component of air being enhanced. A portion of the coproduct effluent gas released from the bed upon copurge with nitrogen at elevated pressure is recovered as oxygen, i.e., less readily adsorbable component, coproduct gas, while an additional portion of said oxygen is introduced to the discharge end of a bed being repressurized by the introduction of feed air to the feed end of said bed. A third portion of such oxygen is introduced to the feed end of a bed after the bed has been at least partially repressurized. A portion of the nitrogen released from the feed end of the bed upon countercurrent depressurization is employed as said nitrogen copurge gas.

The Werner et al. process enables high purity nitrogen to be recovered at a high recovery level, with enriched oxygen coproduct being recovered at a relatively high recovery level. Nevertheless, the complexity of the process and the high compression ratios and through put requirements of the system results in relatively high capital and operating costs for this processing approach.

Despite such efforts in the art, those skilled in the art will appreciate that a need remains for the development of improved PSA processing for the production of nitrogen as the more readily adsorbable component of air, wherein the desired nitrogen product can be recovered at high purity levels at relatively low capital and operating costs. Such improvement would enhance the ability of the highly desirable pressure swing adsorption technology to satisfy the need for high purity, low cost nitrogen for a variety of practical, commercially desirable industrial applications.

It is an object of the invention, therefore, to provide an improved PSA process and system for the production of high purity nitrogen.

It is another object of the invention to provide a simplified PSA process and system for the production of high purity nitrogen from air.

It is another object of the invention to provide a PSA process and system capable of minimizing the capital costs, power consumption, and overall costs of recovering high purity nitrogen product from air.

It is a further object of the invention to provide an improved PSA process and system for the recovery of the more readily adsorbable component of a feed gas mixture as a desired high purity product gas.

With these and other objects in mind, the invention is hereinafter described in detail, the novel features thereof being particularly pointed out in the appended claims.

SUMMARY OF THE INVENTION

High purity nitrogen is recovered from air in a PSA process and system invoking the use of two or more adsorbent beds operated on a cyclic basis with an operating cycle comprising (1) backfill with enriched oxygen gas, (2) pressurization with feed air, (3) cocurrent purge, (4) blowdown, (5) evacuation, and (6) countercurrent purge. The high purity nitrogen product is obtained at an advantageously low cost as a result of reduced power consumption, at similar or lower capital costs as compared to prior art processes and systems. The invention can also be used to separate the more readily adsorbable component of other feed gas mixtures as a high purity, low cost product gas.

BRIEF DESCRIPTION OF THE DRAWING

The invention is hereinafter described in detail with reference t the accompanying drawing, which is a schematic flow diagram illustrating a preferred embodiment of the two bed vacuum PSA nitrogen system of the invention.

DETAILED DESCRIPTION OF THE INVENTION

The objects of the invention are accomplished by the use of a novel and simplified vacuum processing cycle in PSA gas separation processes and systems for the recovery of the more readily adsorbable component of the feed gas mixture as a high purity low cost product gas. The processing cycle avoids the complexity of various prior art approaches to the recovery of the more readily adsorbable component as the desired product gas, and enables the power consumption to be significantly reduced as compared to other vacuum PSA cycles. While the invention is hereinafter described with particular reference to the recovery of nitrogen from air as the more readily adsorbable component thereof, it will be appreciated that the processing cycle of the invention can be employed in PSA processes and systems for the separation of other feed gas mixtures in which the more readily adsorbable component of the feed gas is recovered as the desired product gas.

The processing cycle of the invention generally comprises various pressurization and depressurization steps operating between a low, subatmospheric desorption pressure and an upper, above-atmospheric adsorption pressure, coupled with advantageous purge or displacements steps at said upper and lower pressures to enhance the recovery and purity of the more readily adsorbable component recovered at the lower desorption pressure as high purity, low cost product gas. Various processing modifications are also employed in particular embodiments to enhance the performance of the process and system of the invention as applied with respect to the requirements of particular air separation or other feed gas separation applications.

The invention is generally practiced in PSA systems for the selective adsorption of nitrogen from air, or of other more readily adsorbable components of gas mixtures, wherein at least two adsorbent beds are employed, with each of the beds undergoing the processing cycle herein disclosed and claimed in an appropriate sequence as related to the other beds in the system so as to facilitate the carrying out of continuous gas separation operations in such systems. In preferred embodiments of the invention, two or three adsorbent beds are commonly employed.

As employed for air separation applications, each bed in the system, commencing upon the desired repressurization of the clean bed from its lower subatmospheric desorption pressure, undergoes a PSA cycle comprising: (1) partial countercurrent repressurization from said lower desorption pressure to an intermediate pressure level by backfilling the bed with enriched oxygen gas introduced into the discharge end of the bed, i.e., in a direction countercurrent to the flow of feed air during the subsequent feed air repressurization step, (2) further cocurrent repressurization from said intermediate pressure level to the upper adsorption pressure by the introduction of feed air to the inlet end of the bed, with nitrogen being selectively adsorbed as the more readily adsorbable component, and with an oxygen enriched stream being withdrawn from the discharge end of the bed and passed to a surge tank used for the storage of the enriched oxygen produced during the cycle, (3) cocurrent purge or displacement at said upper adsorption pressure by the passage of product quality nitrogen to the discharge end of the bed from the feed end thereof, with oxygen-enriched gas continuing to be withdrawn from the discharge end of the bed and passed to said surge tank during this step, a portion of the oxygen-enriched gas stream withdrawn from the bed being used for purge and/or backfilling another bed in the system; (4) initial countercurrent depressurization or blowdown in which high purity nitrogen gas is discharged from the feed end of the bed as the pressure is reduced from the upper adsorption pressure to an intermediate pressure level; (5) further countercurrent depressurization or evacuation in which additional high purity nitrogen is discharged from the feed end of the bed as the pressure is further reduced from said intermediate pressure level to a subatmospheric pressure level by means of a vacuum pump or other suitable means for creating a pre-determined sbbatmospheric pressure level; and (6) countercurrent purge in which enriched oxygen gas withdrawn from another bed in the system is passed to the discharge end of the bed, and additional high purity nitrogen is discharged from the feed end of the bed essentially at said subatmospheric pressure level. It will be appreciated that, in each of the three countercurrent depressurization steps, which comprise regeneration steps in processes for the recovery of the less readily adsorbable component as the desired product gas, high purity nitrogen gas is recovered from the feed end of the bed. This gas is either withdrawn from the system as desirable high purity nitrogen product gas, or is stored in a surge tank and subsequently used as purge gas during the cocurrent purge step in the same bed or other beds in the system.

In the step of further cocurrent repressurization from intermediate pressure to the upper adsorption pressure, and in the further cocurrent purge step at the upper adsorption pressure, it has been indicated that enriched oxygen gas is withdrawn from the bed and is recycled for countercurrent purge or is passed to a surge tank used to store enriched gas produced during the cycle or gas to be used as partial countercurrent repressurization gas in the backfilling step. It will be appreciated that part of this oxygen-enriched gas is removed from the PSA system and constitutes the net enriched oxygen produced by the cycle.

Following the three countercurrent depressurization step in which high purity nitrogen product gas is recovered from the feed end of the bed, it will be noted that the next step in the cycle, i.e., the backfill with enriched oxygen step, also involves a countercurrent flow direction. Such backfilling with enriched oxygen, in a countercurrent direction, contributes to the overall process performance in several ways. Thus, the oxygen gas serves to displace previously adsorbed nitrogen gas towards the feed end of the bed by lowering the effective nitrogen partial pressure at the discharge end of the bed. This contributes to increasing the sharpness of the mass transfer zone developed between the oxygen and nitrogen during adsorption and increases the amount of nitrogen recovered from the feed air. Additionally, by employing the backfilling step prior to the feed repressurization adsorption steps, the average adsorption pressure is raised, thereby increasing the adsorptive capacity of the adsorbent material comprising the bed.

In the processing cycle as described above, pressurization with feed air initiates after the backfill step. In an alternative embodiment, the feed air step may be initiated when the bed begins receiving oxygen backfill. In this case, the bed is repressurized simultaneously from both ends thereof. This serves to increase the utilization of the compressor supplying feed air, but results in slightly lower process performance because the backfill gas is thereby rendered less effective in displacing nitrogen gas to the feed end of the vessel than when the backfill step is carried out prior to the feed air repressurization step.

Following the pressurization of the bed with feed air, the bed is purged in the cocurrent direction at the upper adsorption pressure using product quality nitrogen purge gas. As indicated above, oxygen-enriched gas is continually withdrawn from the discharge end of the bed during this step, carried out essentially at said adsorption pressure level. A portion of this oxygen-enriched effluent gas, advantageously said gas withdrawn during the latter portion of the cocurrent purge step, is used for backfilling another bed in the system. The copurge nitrogen gas serves to clean the bed by displacing the less readily adsorbable oxygen gas, which had either been previously adsorbed or was present in the interparticle void spaces in the bed, from the discharge end of the bed. Thus, the adsorbent bed consists mainly of desired nitrogen gas prior to the commencing of the countercurrent depressurization steps. In this regard, it should be noted that the cocurrent purge step is desirably terminated when the mass transfer zone of adsorbed nitrogen reaches the discharge end of the bed and begins to move out of the bed, i.e., when the oxygen purity of the oxygen-enriched gas removed from the discharge end of the bed during said copurge step begins to degrade.

The process and system of the invention thus utilizes the cocurrent purge step, employing nitrogen purge gas, at adsorption pressure to advantageously clean out the bed in preparation for the three countercurrent depressurization steps in which high quality nitrogen is recovered from the feed end of the bed. The third of such countercurrent depressurization steps, employing oxygen purge gas, will be understood to be of importance in achieving the desired optimal performance from the process and system of the invention. During said countercurrent purge at subatmospheric desorption pressure, nitrogen gas, present in the interparticle voids or previously adsorbed on the bed, is either removed from the feed end of the bed or is displaced in the direction of said feed end of the bed. This countercurrent purge step serves several important purposes. First, it enables the capacity of the adsorbent bed to be increased prior to the next succeeding pressurization-adsorption step. Secondly, as with the next succeeding backfill step with enriched oxygen, in which partial countercurrent repressurization from the lower subatmospheric desorption pressure is achieved, the countercurrent purge step, in which the bed is depressurized to said lower subatmospheric desorption pressure, serves to increase the sharpness of the mass transfer zone of the more readily adsorbable nitrogen component of feed air.

The carrying out of an oxygen countercurrent purge step at a subatmospheric desorption pressure, as in the practice of the invention, is not a feature of conventional practice because of concern with oxygen, i.e., the less readily adsorbable component, breakthrough in processes and systems employing an equilibrium selective adsorbent material to produce a high purty product comprising nitrogen as the more readily adsorbable component of the feed air. Premature breakthrough of oxygen would obviously result in a decrease in the purity of the nitrogen being produced. While the subject oxygen countercurrent purge step of the invention is commonly omitted in prior art PSA nitrogen cycles, the consequences of such omission can be significant in terms of the performance and power consumption characteristics of such prior art cycles.

At a given evacuation pressure, i.e., subatmospheric desorption pressure level, the use of a countercurrent purge step employing oxygen-enriched purge gas will lower the amount of nitrogen adsorbed by the bed, since the nitrogen partial pressure in the bed is reduced. This circumstance not only increases the nitrogen adsorptive capacity of the bed prior to the pressurization with feed air step, but also increases the sharpness of the developing mass transfer zone in said subsequent pressurization step because of the displacement of desorbed and interparticle nitrogen to the feed end of the bed.

As employed for purposes of the invention, the pressurization with feed air comprises a repressurization-adsorption step in which the more readily adsorbable component of the feed air, i.e. nitrogen, is more readily adsorbed, and the less readily adsorbable component, i.e. oxygen, is withdrawn from the discharge end of the bed and passed from the system or to a surge tank as indicated above. Part of this oxygen-enriched stream is used in a subsequent backfill step. Such a processing step, in which a gas is passed to the feed end of a bed, the more readily adsorbable component of the gas is selectively adsorbed and the less readily adsorbable component is withdrawn from the discharge end of the bed, all at rates such that the pressure of the bed is caused to increase, is commonly referred to as an increasing pressure adsorption step. Such processing has been described in the McCombs patent, U.S. Pat. No. 3,738,087. While the pressurization step with feed air as employed in the practice of the invention can consist of such an increasing pressure adsorption step, another embodiment of the invention comprises a processing sequence in which the air feed step comprises three separate processing steps, commencing with the bed at an intermediate pressure level following oxygen backfill. The first part of the air feed step is thus preferably a repressurization step in which feed air is passed to the feed end of the bed, and no gas is withdrawn from the discharge end thereof, the pressure of the bed increasing from said intermediate pressure to an upper intermediate pressure. The next part of said air feed step is the increasing pressure adsorption step in which the bed pressure increases from the upper intermediate pressure level to the upper adsorption pressure. The last part of said air feed step comprises a constant pressure adsorption step in which air continues to be passed to the feed end of the bed, nitrogen is selectively adsorbed as the more readily adsorbable component and oxygen is withdrawn from the discharge end of the bed, the pressure of the bed remaining at the upper adsorption pressure level. Those skilled in the art will appreciate that various other embodiments can be employed during the pressurization with feed air of the overall cycle. Thus, the initial partial repressurization with feed air and the increasing pressure adsorption steps can be carried out without the constant pressure adsorption step of the preferred embodiment. In a generally preferred embodiment, however, it is desirable to increase the bed pressure from said intermediate pressure to the upper adsorption pressure, without an increasing pressure adsorption step, but with a constant pressure adsorption step following said repressurization to provide the necessary withdrawal of oxygen-enriched gas from the discharge end of the bed.

The processing cycle of the invention, operating between a lower, subatmospheric desorption pressure and an upper, above atmospheric adsorption pressure, is desirably operated in a two bed or in a three-bed system. The use of a two bed system is generally preferred for the overall purposes of the invention. It will be understood that each bed in the system, on a cyclic basis, undergoes a processing sequence involving the basic steps discussed above, interrelated to said processing sequence as carried out in the other bed or beds in the system. Table I illustrates the operation of the invention, including the sequential steps of (1) backfill with oxygen, (2) pressurization with feed air, (3) cocurrent purge with nitrogen, (4) contercurrent blowdown, (5) countercurrent evacuation and (6) countercurrent purge with oxygen as carried out in a two-bed PSA system.

TABLE I

| Basic Steps For 2-Bed Vacuum PSA Nitrogen Process | |
|---|---|
| Bed A | Bed B |
| Backfill by Enriched Oxygen | Blowdown |
| Pressurization by Feed Air* | Evacuation |
| Copurge by Enriched Nitrogen | Evacuation |
| Copurge by Enriched Nitrogen | Purge by Enriched Oxygen |
| Blowdown | Backfill by Enriched Oxygen |

TABLE I-continued

Basic Steps For 2-Bed Vacuum PSA Nitrogen Process

| Bed A | Bed B |
|---|---|
| Evacuation | Pressurization by Feed Air* |
| Evacuation | Copurge by Enriched Nitrogen |
| Purge by Enriched Oxygen | Copurge by Enriched Nitrogen |

*This step can be combinations of air feed repressurization and adsorption. The pressurization can be up to ambient pressure without compressor utilization or above ambient pressure by compression. The adsorption step can be constant and/or increasing pressure adsorption.

The apparatus employed in the two-bed system as illustrated in Table I utilizes a vacuum pump, nitrogen product compressor, and time-shared blower means for both air feed and nitrogen copurge purposes. The two bed system also requires the use of an enriched oxygen storage tank to supply oxygen gas for use in the backfill step, whereas such oxygen storage tank is optional in the three bed system.

It should be noted that, without the countercurrent purge with oxygen step, the evacuation level would have to be reduced in order to achieve the same regeneration or cleaning effect, i.e., to render the adsorbent bed substantially free of adsorbate, i.e., the more readily adsorbable component, and of residual gases present in the interparticle voids of the bed, prior to repressurization of the clean bed in the next processing cycle. Such lower evacuation level would be understood to result in both higher capital costs and higher power consumption for the vacuum pump. This is the case not only because lower evacuation pressure levels raise the average compression ratios of the vacuum pump, but because such lower pressure levels raise the capacity requirements for the pump in order to achieve such lower pressure. Additionally, lowering the vacuum level to achieve the same residual nitrogen content will tend to cause a less sharp mass transfer zone to be produced, since the remaining nitrogen will tend to be distributed uniformly throughout the bed, as opposed to being concentrated near the feed end of the bed. Thus, further reductions in the vacuum level may still be necessary in order to achieve the same process performance as is achieved, in the practice of the invention, by the inclusion of a countercurrent purge following the evacuation step of the overall processing cycle.

A preferred embodiment of the practice of the invention in a two-bed system is illustrated in Table II. This embodiment incorporates the processing steps as indicated in Table I above, as carried out in each bed on a cyclic basis, wherein one bed is undergoing the repressurization phase of the overall cycle while the other bed is undergoing the depressurization phase of said cycle. In the Table II embodiment, however, it will be seen that the repressurization phase, following backfill by enriched oxygen, comprises repressurization by air followed by a constant pressure adsorption step at the upper adsorption pressure level prior to the copurge with enriched nitrogen step. Table II also recites the time and pressure conditions pertaining in bed A during each step of the overall processing cycle, with bed B undergoing the same time and pressure conditions during each such recited step as carried out in the related processing sequence in said bed B.

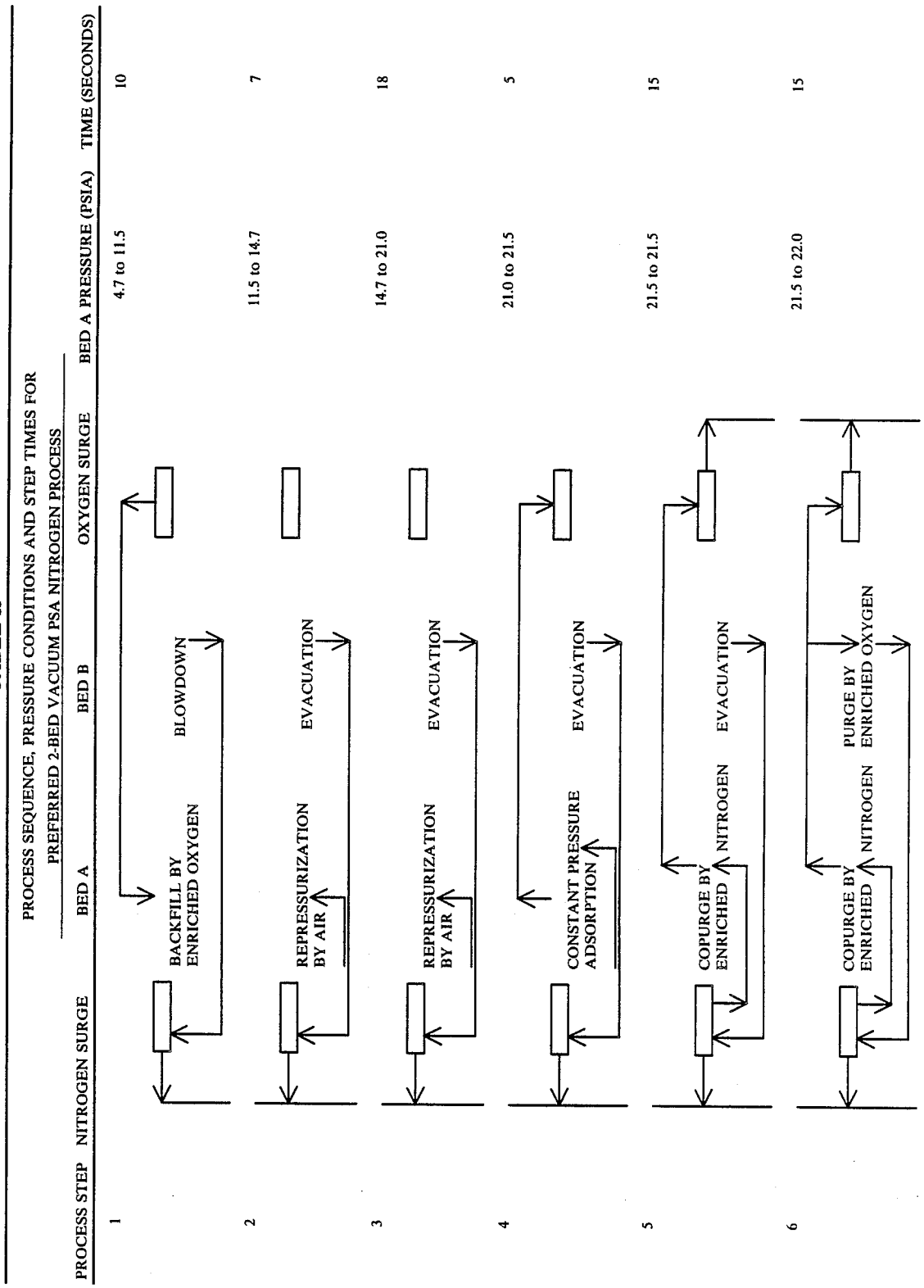

TABLE II-continued

PROCESS SEQUENCE, PRESSURE CONDITIONS AND STEP TIMES FOR PREFERRED 2-BED VACUUM PSA NITROGEN PROCESS

| PROCESS STEP | NITROGEN SURGE | BED A | BED B | OXYGEN SURGE | BED A PRESSURE (PSIA) | TIME (SECONDS) |
|---|---|---|---|---|---|---|
| 7 | | BLOWDOWN | BACKFILL BY ENRICHED OXYGEN | | 22.0 to 14.7 | 10 |
| 8 | | EVACUATION | REPRESSURIZATION BY AIR | | 14.7 to 11.0 | 7 |
| 9 | | EVACUATION | REPRESSURIZATION BY AIR | | 11.0 to 7.4 | 18 |
| 10 | | EVACUATION | CONSTANT PRESSURE ADSORPTION | | 7.4 to 6.3 | 5 |
| 11 | | EVACUATION | COPURGE BY ENRICHED NITROGEN | | 6.3 to 5.0 | 15 |
| 12 | | PURGE BY ENRICHED OXYGEN | COPURGE BY ENRICHED NITROGEN | | 5.0 to 4.7 | 15 |

NITROGEN PRODUCT

ENRICHED OXYGEN

A two-bed vacuum PSA nitrogen system suitable for use in the practice of the processing sequence of the Table II embodiment of the invention is shown in the drawing. Thus, the system comprises adsorbent bed A and adsorbent bed B, together with suitable oxygen and nitrogen storage vessels, and a time-shared blower, vacuum pump and product compressor. Feed air enters the system through flow line 1 containing filter F and valve 2. Line 3 connected to said feed flow line contains time-shared blower 4 and connects to discharge line 5 containing valve 6 and to line 7 that connects to line 8, containing valve 9, and line 10, containing valve 11, that pass to bed A and to bed B, respectively, preferably to the lower end thereof as illustrated. Between valve 9 and bed A, line 12, containing valve 13 passes to vacuum pump 14 and water separator 15, containing discharge conduit 16. Similarly, between valve 11 and bed B, line 17 containing valve 18, passes from line 10 to connect with said line 12 passing to vacuum pump 14 and water separator 15.

Line 19 will be seen to pass from water separator 15 tollines 20 and 21. Line 20 passes, in turn, to product compressor 22 after cooler 23 and separator 24, having discharge conduit 25. Line 26 extends from separator 24 to dryer system 27, having discharge conduit 28 and line 29 that connects with line 21 passing to nitrogen storage vessel 30. Line 31 containing valve 43 extends from said vessel 30 to line 1, and line 32 containing valve 33 will be seen to extend from said line 31 to said line 12.

Lines 34 and 35, containing valves 36 and 37 respectively, extend from beds A and B, respectively, preferably from the upper portion thereof, to line 38 that passes to line 39 connected to oxygen storage vessel 40. Line 41 that connects said lines 38 and 39 provides for the discharge of gas from the system and contains back-pressure regulator 42.

In the practice of the two bed embodiment illustrated in Table II and in the drawing, bed A will be at the lowest subatmospheric process pressure, while bed B will be at the upper, above atmospheric adsorption pressure at the start of the cyclic processing sequence. During backfill of bed A with enriched oxygen gas, valve 36 will be open to allow gas from oxygen storage tank 40 to enter bed A through conduits 39, 38 and 34. Oxygen backfill will continue until a predetermined bed pressure level is reached in bed A. Simultaneously, bed B will begin its depressurization sequence by blowing down high purity nitrogen gas into nitrogen storage tank 30 via valves 18 and 33, and conduits 10, 32 and 31. Such blowdown of bed B will continue until the bed pressure in said bed B is essentially equal to that of the ambient pressure pertaining to the particular air separation application being carried out in the system of the invention.

It should be noted that the use of time-shared blower 4 and vacuum pump 14 are not required during this blowdown step. Dead ending of blower 4 is prevented, however, by opening valves 2 and 6. Air will thus be drawn in through conduit 1, filter F and line 3, with the air being discharged by the blower through conduit 5. During blowdown, a small portion of the blowdown gas will travel through vacuum pump 14, water separator 15 and conduit 19, for passage into nitrogen storage tank 30, thus preventing said vacuum pump 14 from dead-ending. It should be noted that nitrogen storage tank 30 is preferably made of an appropriate non-rigid material that will provide for a flexible, rather than fixed, tank volume, with said tank volume varying with the amount of gas to be contained therein. This feature serves to significantly reduce the cost of the tank as compared to the providing of a fixed volume tank capable of retaining the maximum volume of gas required for storage during the operation of the cyclic process of the invention.

At the conclusion of the first step interval, i.e. said backfill and blowdown period as described above, valves 6 and 33 are closed, and valve 9 is opened. Air drawn into the system through conduit 1 and valve 2 now enters bed A through valve 9 and conduit 8. Bed A now undergoes the three-part repressurization-adsorption step. Initially, bed A is repressurized from a subatmospheric pressure up to ambient pressure. The pressure in bed A then continues to rise up to a given superatmospheric pressure level, i.e. the upper adsorption pressure of the system. In the final portion of this repressurization-adsorption step, the bed pressure remains essentially constant at said upper adsorption pressure level, while feed air is still passed to the feed end of said bed A, nitrogen is adsorbed as the more readily adsorbable component of the feed air, and enriched oxygen, the less readily adsorbable component, continues to be withdrawn from the discharge end of said bed A via line 34 and valve 36. Initially, all of the oxygen-enriched effluent gas passes into oxygen storage tank 40. Said tank thus fills up to a predetermined pressure, at which time back-pressure regulator 42 will open, allowing any further oxygen-enriched effluent gas to be removed from the system through line 41. This adsorption step is continued for a predetermined time interval.

During the time that bed A is thus receiving feed air in said repressurization-adsorption sequence, bed B is undergoing a portion of its evacuation step. Valve 18 remains open, while valve 33 is closed. Gas is withdrawn from said bed B through lines 10 and 17, and valve 18, passes through vacuum pump 14 and water separator 15, from which water is discharged through conduit 16, and enters nitrogen storage tank 30.

Following termination of the adsorption step, i.e. step 4 in Table II, bed A is switched from the feed step to the copurge step. Thus, valve 2 is closed, while valve 32 is opened. High purity nitrogen gas then flows from nitrogen storage tank 30 through conduit 31, valve 2, blower 4, lines 7 and 8, valve 9, and line 8 into bed A. It should be noted that the blower supplying the high pressure copurge gas in this step is the same blower that previously supplied feed air in the repressurization adsorption steps, i.e. blower 4. Oxygen enriched effluent gas continues to be removed through line 34 and valve 36 and either enters oxygen storage tank 40 or exits the system through back pressure regulator 42. The pressure in bed A remains constant over the course of said nitrogen copurge step at the upper adsorption pressure level. During the initial portion of the copurge step, bed B continues to undergo evacuation to a predetermined subatmospheric pressure level.

Once bed B attains the desired subatmospheric pressure, valve 37 is opened, and a ortion of the oxygen-enriched effluent gas from bed A enters bed B through lines 35, 38 and 34. The pressure in bed B continues to decrease as further nitrogen gas discharged therefrom enters nitrogen storage tank 30 via lines 10 and 17, valve 18 and said vacuum pump 14. Bed A continues to undergo copurge during this predetermined time interval.

When copurge step 6 of Table II is completed in bed A, one half of the cycle sequence of this processing embodiment of the invention is completed, and the bed functions are rotated or reversed. Bed A now begins the depressurization sequence previously undergone by bed B, while said bed B undergoes backfill, repressurization-adsorption and copurge in the same manner as did bed A in the step 1–6 sequence.

The PSA process of the invention is advantageously practiced at pressure swings from a low, subatmospheric pressure to a pressure above one atmosphere. Since the product nitrogen gas is obtained during depressurization of the vessels, the pressure in the nitrogen product storage tank 30 will be seen to be only slightly above ambient, and thus a product compressor may be included in the system. As shown in the drawing, product compressor 22 continuously receives product nitrogen gas from storage tank 30 via line 20. After compression, the nitrogen gas is cooled in after cooler 23, with any resulting condensed water being removed in separator 24 for discharge through conduit 25. Residual water is removed by dryer system 27, which can be a conventional pressure or thermal swing adsorption dryer. Product nitrogen gas exits the system through line 28. Preferably, dryer 27 is operated as a high-recovery dryer in accordance with conventional practice, with nitrogen purge gas from said dryer 27 being returned to the system via line 29. The dryer purge gas is returned to avoid loss of product nitrogen.

It is within the scope of the invention, if so desired, to pre-dry the feed air to the system. The particular drying arrangement, however, does not form a part of the gas separation process and apparatus of the invention. If the feed air is not pre-dried, the front end of the bed acts as a drying zone and thus does not contribute appreciably to the main feed gas separation operation per se. In such instances, the effective zone of the adsorbent bed is, therefore, somewhat shorter than the overall bed length. Such a drying zone in the bed will generally comprise less than 50% of the total bed length, typically considerably less. During the bed depressurization sequence, the previously adsorbed water is desorbed and leaves the bed with the high purity nitrogen withdrawn from the feed end of the bed.

Those skilled in the art will appreciate that the overall cycle time and the individual step times for any given processing operation will vary depending on the feed gas mixture being separated, the product purity and recovery levels desired, the operating conditions employed, the particular adsorbent material and the number of beds included in the adsorption system, and various economic factors, such as the trade offs between capital and operating costs necessary for a particular application. It will be understood that shorter step times, and hence reduced overall cycle times, serve to minimize the volume requirements of vessels for the containment of adsorbent beds, the surge tank requirements, and the amount of adsorbent employed, but serve to increase valve utilization. Depending upon the characteristics of the particular adsorbent employed, shorter cycle times may also result in lower product recovery and/or higher power consumption. The minimum time allowable for any particular operating step will generally be determined by adsorbent crushing and fluidization considerations.

The embodiment illustrated in Table II will be seen to provide for a two bed system with an overall cycle time of 140 seconds. The individual step times are based upon the use of only two machines—a vacuum pump and a time-shared blower—for the handling of process gas flow during the cycle. It will be noted that, although the blower handles both the feed air (or other feed gas) and copurge flows, the flowrate of each stream and the individual step times may not be the same. In the 140-second cycle shown in Table II, it will be seen that the backfill step comprises 10 seconds, and that the repressurization adsorption steps and the copurge step each comprise 30 seconds, blowdown comprises 10 seconds, evacuation 45 seconds, and the backpurge step comprises 15 seconds.

The practice of the invention in a 3-bed system is illustrated in Table III. Such a 3-bed system is generally preferred for high production requirement applications, but would not typically be cost effective as compared to a 2-bed system for supplying low volumes of product, i.e. less than 50 tons per day. It wil be seen in said Table III that the basic process steps and cycle use are the same as for the 2-bed system illustrated above. While the bed pressures for the illustrated 3-bed system embodiment are the same as for the 2-bed system of Table II, it will be seen that the operating times for the individual steps for said 3-bed embodiment differ from the 2-bed system embodiment, with the overall cycle time for said 3-bed embodiment being 180 seconds.

TABLE III

PROCESS SEQUENCE, PRESSURE CONDITIONS, AND STEP TIMES FOR
PREFERRED 3-BED VACUUM PSA NITROGEN PROCESS

| PROCESS STEP | NITROGEN SURGE | BED A | BED B | BED C | BED A PRESSURE (PSIA) | TIME (SECONDS) |
|---|---|---|---|---|---|---|
| 1 | | BACKFILL BY ENRICHED OXYGEN | EVACUATION | COPURGE BY ENRICHED NITROGEN | 4.7 to 11.5 | 30 |
| 2 | | REPRESSURIZATION BY AIR | EVACUATION | BLOWDOWN | 11.5 to 14.7 | 5 |
| 3 | | REPRESSURIZATION BY AIR | EVACUATION | BLOWDOWN | 14.7 to 21.0 | 10 |
| 4 | | CONSTANT PRESSURE ADSORPTION | PURGE BY ENRICHED OXYGEN | BLOWDOWN | 21.0 to 21.5 | 15 |
| 5 | | COPURGE BY ENRICHED NITROGEN | BACKFILL BY ENRICHED OXYGEN | EVACUATION | 21.5 to 22.5 | 30 |
| 6 | | BLOWDOWN | REPRESSURIZATION BY AIR | EVACUATION | 22.5 to 19.5 | 5 |
| 7 | | BLOWDOWN | REPRESSURIZATION BY AIR | EVACUATION | 19.5 to 17.6 | 10 |

TABLE III-continued

PROCESS SEQUENCE, PRESSURE CONDITIONS, AND STEP TIMES FOR PREFERRED 3-BED VACUUM PSA NITROGEN PROCESS

| PROCESS STEP | BED A | BED B | BED C | BED A PRESSURE (PSIA) | TIME (SECONDS) |
|---|---|---|---|---|---|
| 8 | BLOWDOWN | CONSTANT PRESSURE ADSORPTION | PURGE BY ENRICHED OXYGEN | 17.6 to 14.7 | 15 |
| 9 | EVACUATION | COPURGE BY ENRICHED NITROGEN | BACKFILL BY ENRICHED OXYGEN | 14.7 to 6.7 | 30 |
| 10 | EVACUATION | BLOWDOWN | REPRESSURIZATION BY AIR | 6.7 to 6.0 | 5 |
| 11 | EVACUATION | BLOWDOWN | REPRESSURIZATION BY AIR | 6.0 to 5.0 | 10 |
| 12 | PURGE BY ENRICHED OXYGEN | BLOWDOWN | CONSTANT PRESSURE ADSORPTION | 5.0 to 4.7 | 15 |

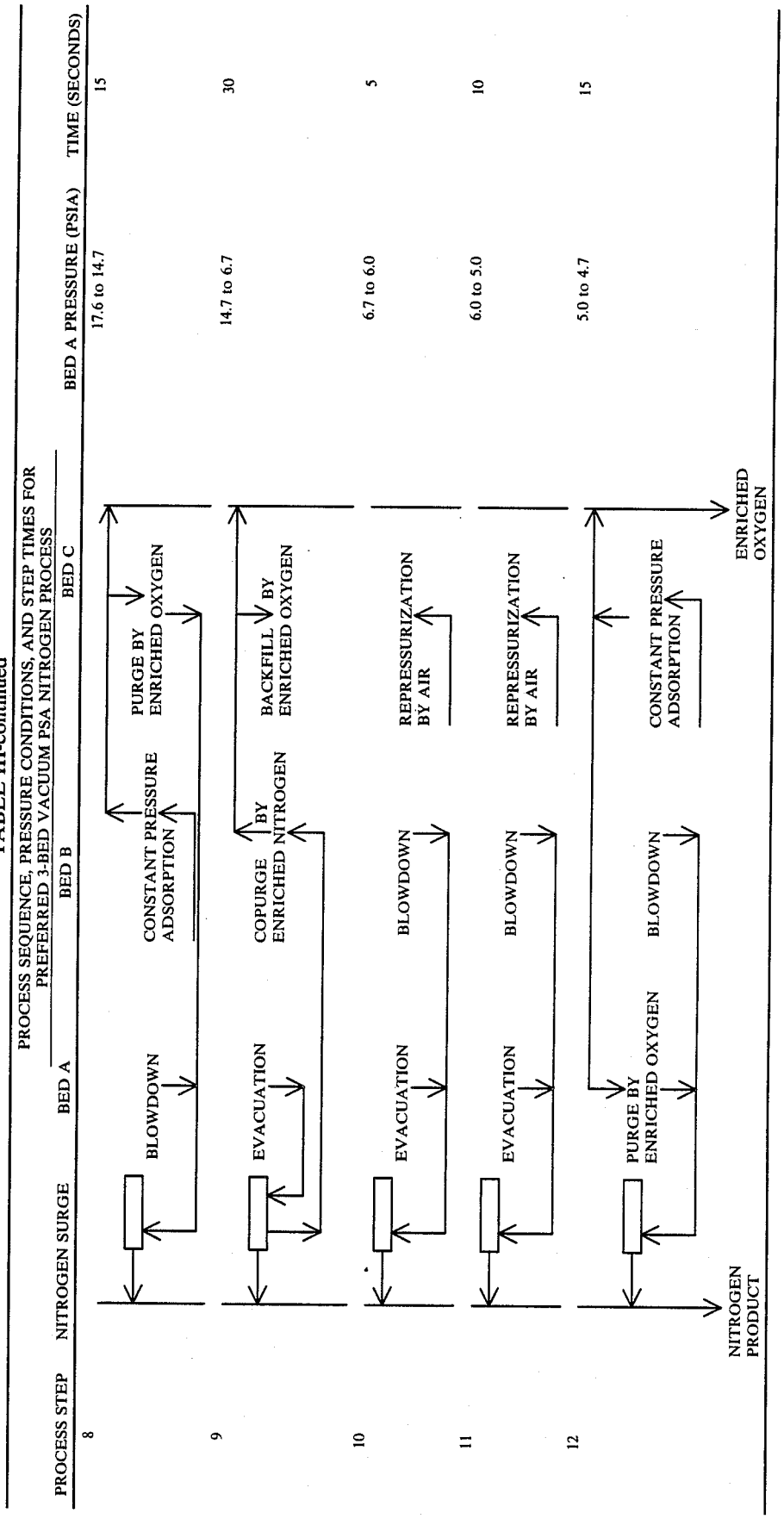

In addition to the incorporatio of a third adsorbent bed, with its associated vessel and valve requirements, other modifications pertain to the 3-bed embodiment of the invention. Thus, it has been found that the addition of a third adsorbent bed enables full utilization of said time-shared blower to be realized, thereby eliminating the need for vent valve 6 as shown in the drawing. In addition, the size of the enriched oxygen tank can be reduced in said 3-bed system, since backfill gas can be supplied directly from another vessel in the 3-bed system. A third bottom product manifold, along with one more valve per bed, is also required, since at specific times in the cycle more than one adsorption bed is undergoing a particular portion of its depressurization seguence. The common valve used in the 2-bed embodiment of the drawing during the blowdown steps is, however, eliminated in the 3-bed embodiment.

In the practice of the invention, the adsorbent material used in the adsorbent beds can be any suitable, available adsorbent capable of selectively adsorbing a more readily adsorbable component from a feed gas mixture containing said component and a less readily adsorbable component. In the air separation application in which it is desired to selectively adsorb nitrogen as the more readily adsorbable component, for recovery as herein disclosed and claimed, with oxygen comprising the less readily adsorbable component, a variety of commercially available adsorbents exhibiting the desired selectivity for the adsorption of nitrogen as the more readily adsorbable component of air may be employed. For example, well known molecular sieves, such as 5A and 13X material, may conveniently be employed. When the feed gas is not pre-dried, it is within the scope of the invention to employ any desired adsorbent material exhibiting water selectivity in the drying zone of bed as referred to above. Said 5A and 13X molecular sieves, silica and alumina are representative examples of such materials. It will be appreciated, therefore, that the adsorbent bed can be a composite, i.e. a bed employing more than one type of adsorbent. In the interest of system simplicity, however, the bed is preferably composed of a single type of adsorbent, with said single adsorbent being used for both drying and separation in the event that it is desired to maintain the pre dryer in the front end of the adsorbent bed. Those skilled in the art will appreciate that the performance levels achieved in the practice of the invention will be affected by the adsorption characteristics of the particular adsorbent employed, with improved adsorbents obviously contributing to the benefits derived from the practice of the invention.

While a wide variety of adsorbent materials may thus be employed in the practice of the invention for air separation or other desirable gas separation operations employing the PSA process and system of the invention, it has been found particularly desirable to employ the lithium cation forms of zeolite X in the practice of particular embodiments of the invention for the recovery of nitrogen from air or from other nitrogen-containing gas streams. Such lithium X, i.e. LiX, adsorbent material is found to exhibit an extraordinary capacity and selectivity toward the adsorption of nitrogen from air or other streams containing less polar or less polarizable molecular species, such as oxygen. Such LiX adsorbent thus provides a desirable improvement in PSA-nitrogen gas separation operations, including separations of nitrogen from admixture with hydrogen, argon and the like as well as air separation operations.

The LiX adsorbent materials desirably used in the practice of the invention are the lithium cation forms of zeolite X in which the framework $Si/Al_2$ molar ratio is from about 2.0 to about 3.0, preferably from 2.0 to 2.5, and in which at least about 88%, preferably at least 90%, more preferably at least 95%, of the $AlO_2^-$ tetrahedral units are associated with lithium cations. The nitrogen adsorption properties of such highly exchanged forms of LiX are totally unpredictable from the results obtainable using LiX materials in which 86 equivalent percent or less of the cations are lithium and the remainder are principally sodium cations. It has further been discovered that an increase in the relative proportion of $AlO_2^-$ tetrahedral units in the zeolite X framework from 44.4% of the total tetrahedral units to 50% of said total units, with a corresponding increase in $Li^+$ ions, i.e. the same equivalent percent of $Li^+$ ions in each case, also serves to increase the adsorption capacity and selectivity of the zeolite for nitrogen that is far greater than that related simply to the indicated increase in the number of cations in the LiX material.

In the preparation of the LiX materials for use in the practice of the invention, conventionally available zeolite X starting materials can readily be employed. Two such materials are zeolite X having $SiO_2/Al_2O_3$ ratios of 2.5 and 2.0, having principally sodium cations, i.e. NaX material. The 2.5 NaX can be synthesized hydrothermally at a temperature of about 100° C. using sodium silicate and sodium aluminate and water as the reagents in accordance with the teachings of the Milton patent, U.S. Pat. No. 2,882,244, with the reaction mixture having the following composition in terms of molar oxide ratios:

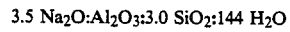

3.5 $Na_2O:Al_2O_3:3.0$ $SiO_2:144$ $H_2O$

The 2.0 NaX material can be synthesized in the mixed sodium-potassium form, as by first dissolving 208 grams of $Al(OH)_3$ in 267 grams of an aqueous 50% NaOH solution, using heating and stirring to form a first solution, i.e. solution (a). Solution (b) is prepared by dissolving 287 grams of 85.3% KOH pellets in 1,000 grams of water and then mixing the solution thus formed with 671 grams of an aqueous 50% NaOH solution. Solution (a) is slowly added to solution (b) to form solution (c), which is cooled to 4°-12° C. Solution (d) is prepared by diluting 453.25 grams of 40-grade sodium silicate (9.6% $Na_2O$; 30.9% $SiO_2$) with 1,131.7 grams of water. The cooled solution (c) is added to solution (d) in a blender and mixed at low speed for 3 minutes. The cooling and the avoiding of the creation of undue amounts of mechanical energy in the final mixing are important factors in the preparation of a high quality product. Gelling should not occur until after about 4 minutes. The gel is aged at 36° C. for 2-3 days and digested at 70° C. for 16 hours. The desired zeolite is then isolated by filtration, and the filter cake is rinsed with aqueous NaOH solution (pH of 12) in an amount equal to seven times the volume of the mother liquor. The rinsed product is reslurried in 4 liters of NaOH solution (pH of 10) and is then recovered by filtration and rinsed with water. The reslurry procedure is desirably repeated two more times, and the isolated product is dried in air. The dried product is slurried in 100 ml of 1% NaOH solution and is maintained in the slurry at 90° C. for 21 hours. After filtration, the cake is reslurried with 1,000 ml of NaOH solution (pH of 12) at 60° C. for 30 minutes and filtered. The reslurry process is desirably repeated twice more, and then the solids are recovered by filtration and washed with aqueous NaOH solution (pH of 9) and dried in air.

Using the 2.5 NaX as prepared above, a zeolite "preform" agglomerate can be produced by first washing the starting zeolite crystals with an aqueous caustic solution having a pH of 12 and consisting essentially of sodium hydroxide and water, and then washing with water to a pH of 9. The washed zeolite crystals are then admixed with Avery clay, a commercially available kaolin type clay, in the proportions of 80 weight % zeolite and 20 weight % clay. The zeolite clay mixture is then combined with sufficient water to produce an extrudable mass with sufficient green strength to enable the extruded pellets to undergo the subsequent firing step in which the kaolinitic clay is converted to an active meta kaolin form at a temperature of about 650° C. for about 1 hour. After firing, the bonded agglomerates are cooled and immersed and digested in an aqueous caustic solution at about 100° C. to convert the bulk of the meta-kaolin to zeolite crystals, mainly zeolite X crystals. The digested agglomerates are removed from the caustic digestion solution, again washed with a fresh aqueous NaOH solution having a pH of 12 and finally washed with water to a pH of 9–10 and dried in air. The dried product pellets are broken and sieved to form particles having a convenient size, such as 16×40 mesh.

Such mesh particles can be activated by heating in a vacuum of 375° C. for a period of about 2.5 hours. This activation is carried out carefully in this manner so that the zeolite NaX crystals are not subjected to undue hydrothermal abuse by the steam formed from occluded and/or adsorbed water. The activated material thus formed is a 2.5 Na X activated material.

In the preparation of LiX material, unactivated mesh particles may be subjected to an ion-exchange procedure whereby the particles are contacted in a glass column by a stream of a 1.0 Molar aqueous lithium chloride, adjusted to a pH of 9.0 using LiOH, at a temperature of 80° C. A quantity of lithium chloride solution is employed such that the zeolite particles are desirably contacted with a four-fold stoichiometric excess of lithium ions over a period of about 14 hours. The ion-exchange solution leaving the column is not recycled. The resulting ion-exchanged product is washed with water, and is adjusted to a pH of 9 using LiOH, and is found to be 94% ion-exchanged.

Using the low silica 2.0 NaKX material prepared as described above, the alkali metal cations can be replaced by lithium cations to the extent of greater than 99 equivalent percent, if desired, by ion-exchange with an aqueous lithium chloride solution (pH of 9, adjusted with LiOH). This material, in powdered form, comprises 2.0 LiX (99%) material.

Those skilled in the art will appreciate that various changes and modifications can be made in the details of the LiX preparation procedures, which do not form a part of the present invention related to improved PSA processing and systems. With this understanding, it should be noted that, for example, a 2.5 NaX material can be ion-exchanged using the volume technique described above with an aquoous lithium chloride solution (pH of 9, adjusted with LiOH) using either less or greater than the four-fold amount of LiCl so that products having various amounts of lithium cations are formed. It will also be appreciated that desirable LiX material can be prepared by such ion-exchange using lithium carbonate or other such lithium salt in place of lithium chloride. Likewise, the resulting LiX materials, constituting desirable adsorbents for use in particular embodiments of the invention, can be used under a variety of operating conditions corresponding to the practical operating requirements of a given application, e.g. a particular feed gas or product gas pressure or temperature condition, and/or to the desired level of separation and recovery pertaining in a given application.

The practice of the invention is hereinafter further described with reference to examples illustrating the capability of the two-bed embodiment thereof to rroduce high purity nitrogen from feed air and the potential for enhanced performance of LiX molecular sieve as compared with 13X molecular sieve thereof. It will be understood, however, that such examples are for illustrative purposes only, and should not be construed as limiting the scope of the invention as described herein and recited in the appended claims.

EXAMPLE 1

The processing sequence of Table I was carried out in a 2-bed system, with each adsorbent bed being 6 feet long and 2 inches in diameter. Each bed contained 5.62 pounds of 13X molecular sieve obtained from Union Carbide Corporation. The processing sequence to which each bed, in turn, was subjected, and the pressure conditions and step times were as set forth in Table IV below. The feed air was pre-dried to remove water therefrom prior to being passed to the absorption system.

TABLE IV

2-Bed Vacuum PSA-Nitrogen Process of the Invention
13X Molecular Sieve Adsorbent in
2 inch Diameter Vessels

| Process Step | Bed Pressure (psia) | Time (Seconds) |
|---|---|---|
| Backfill by enriched oxygen | 2.7–8.0 | 10 |
| Pressurization by feed air | 8.0–20.0 | 30 |
| Copurge by enriched nitrogen | 20.0–23.0 | 60 |
| Blowdown | 23.0–14.0 | 10 |
| Evacuation | 14.0–3.2 | 81 |
| Purge by enriched oxygen | 3.2–2.7 | 29 |
|  |  | 220 sec |

The operating pressure employed will be seen to have varied from a subatomspheric desorption pressure of 2.7 psia at the ned of the countercurrent purge with enriched oxygen to an upper adsorption pressure of 23.0 psia at the end of the cocurrent purge step. The total time for one complete cycle was 220 seconds, witht he process being operated under ambient conditions (i.e. 289°–294° K.). Product nitrogen was produced at a purity of 99.5%, with the nitrogen recovery from the feed air being 64%.

EXAMPLE 2

The 2-bed adsorption system as described in Example 1 was operated as described therein, using feed air, except that LiX molecular sieve obtained from Unior Carbide Corporation was employed in place of 13X molecular sieve. The specific LiX material employed had a lithium ion content greater than 95% and a residual water content of 0.54 weight percent. The processing sequence, pressure conditions and step times were as set forth in Table V below. The feed air was again pre-dried, with the process being carried out under ambient conditions.

TABLE V

2-Bed Vacuum PSA-Nitrogen Process of the Invention
LiX Molecular Sieve Adsorbent
in 2 inch Diameter Vessels

| Process Step | Bed Pressure (psia) | Time (Seconds) |
|---|---|---|
| Backfill by enriched oxygen | 4.7–10.6 | 10 |
| Pressurization by feed air | 10.6–21.4 | 45 |
| Copurge by enriched nitrogen | 21.4–21.9 | 45 |
| Blowdown | 21.9–14.6 | 10 |
| Evacuation | 14.6–5.0 | 81 |
| Purge by enriched oxygen | 5.0–4.7 | 29 |
| | | 220 sec |

The operating pressure will be seen to have varied from a lower subatmospheric desorption pressure of 4.7 psia at the end of said countercurrent purge with enriched oxygen step to an upper adsorption pressure of 21.9 psia at the end of the cocurrent purge step. The total cycle time remained 220 seconds, although the individual feed air and copurge step times were adjusted. The reduction in the operating pressure ratio, as compared to Example 1, was a direct result of the increased adsorptive capacity and selectivity of the LiX adsorbent for nitrogen as opposed to oxygen. The purity level of the product nitrogen remained 99.5%. The recovery of nitrogen, however, increased to 94%.

EXAMPLE 3

In another example of the practice of the invention for the recovery of nitrogen from air, the processing sequence employed in Examples 1 and 2 was used in a 2-bed system, with LiX again employed as the adsorbent. In this example, however, the diameter of each adsorbent vessel was increased to two feet. Analysis of the LiX material employed showed a lithium ion content of 97–98% and a residual water content ranging from 0.4 to 1.1 weight %. No feed air pre drier was employed in this example. Thus, the front end of the beds was used to remove any water entering the adsorption vessels with the feed air. The processing sequence to which each bed, in turn, was subjected, and the pressure conditions and step times were as set forth in Table VI below.

TABLE VI

2-Bed Vacuum PSA-Nitrogen Process of the Invention
LiX Molecular Sieve Adsorbent
in 2 foot Diameter Vessels

| Process Step | Bed Pressure (psia) | Time (Seconds) |
|---|---|---|
| Backfill by enriched oxygen | 3.8–11.5 | 10 |
| Pressurization by feed air | 11.5–21.3 | 37 |
| Copurge by enriched nitrogen | 21.3–21.6 | 38 |
| Blowdown | 21.6–14.4 | 10 |
| Evacuation | 14.4–4.2 | 52 |
| Purge by enriched oxygen | 4.2–3.8 | 23 |

TABLE VI-continued

2-Bed Vacuum PSA-Nitrogen Process of the Invention
LiX Molecular Sieve Adsorbent
in 2 foot Diameter Vessels

| Process Step | Bed Pressure (psia) | Time (Seconds) |
|---|---|---|
| | | 170 sec |

This operating pressure will be seen to have varied from a lower subatmospheric desorption pressure of 3.8 psia at the end of said countercurrent purge with enriched oxygen step to an upper absorption pressure of 21.6 psia at the end of cocurrent purge step. The total cycle time for this embodiment was 170 seconds, with the process being operated under temperature conditions elevated above ambient conditions to an adsorbent temperature ranging from 305° to 322° K. Product nitrogen was again produced at a purity of 99.5%, with the nitrogen recovery from feed air being 72%.

The process of the invention operating between a low, subatmospheric desorption pressure and a convenient upper, above atmospheric adsorption pressure as indicated above, can be carried out at any suitable temperature conditions. Feed temperatures of from about 280° to about 320° K. are generally preferred when 13X adsorbent is being used, while feed temperatures of about 300° to about 380° K. are generally preferred for operations in which LiX adsorbent is employed. Those skilled in the art will appreciate that the preferred temperatures for embodiments using other adsorbent materials may vary from the temperature ranges above and that temperatures outside the preferred ranges can also be employed, if so desired, in particular applications of the invention.

It will be appreciated from the above that the operating conditions employed in the practice of the invention, in its various embodiments such as the generally preferred 2-and 3-bed embodiments disclosed herein, are both convenient and flexible, facilitating the satisfying of the requirements of a particular gas separation operation. Thus, the constraints associated with any particular end user application, e.g. product pressure, power consumption, product purity and the like, can be readily accommodated, while the overall cost of providing desired nitrogen product is minimized. High purity nitrogen can be conveniently produced at high recovery levels, therefore, at desirably low operating and capital costs resulting from the relativity low compression ratios and equipment capacity requirements associated with the practice of the invention. A significant advance in the PSA art is thus achieved by the practice of the invention, particularly with respect to the desirable production of high purity nitrogen in economical vacuum cycle operations.

We claim:

1. An improved pressure swing adsorption process for the recovery of the more readily adsorbable component of a feed gas mixture containing said component and a less readily adsorbable component in an adsorption system having at least two adsorbent beds containing adsorbent material capable of selectively adsorbing said more readily adsorbable component, with the feed gas mixture being introduced to the feed and of the bed, the more readily adsorbable component being withdrawn from said feed end, and the less readily adsorbable component being discharged from the discharge end of the bed, each bed, on an alternating cyclic basis, undergoing a processing sequence comprising:

(a) introducing less readily adsorbable component enriched gas into the discharge end of the bed to partially countercurrently repressurize the bed from its subatmospheric desorption pressure level to an intermediate pressure level, such countercurrent backfilling of the bed serving to displace previously adsorbed more readily adsorbable component toward the feed end of the bed, thereby enhancing the sharpness of the mass transfer zone being the less and more readily adsorbable components of the feed gas mixture and increasing the amount of said more readily adsorbable component recoverable from the feed gas mixture;

(b) passing the feed gas mixture to the feed end of the bed, the bed being cocurrently repressurized from said intermediate pressure to its upper adsorption pressure, with said more readily adsorbable component being selectively adsorbed, and with a less readily adsorbable component stream being withdrawn from the discharge end of the bed, a portion of said stream being withdrawn from the system, the remaining portion of said less readily adsorbable component stream being passed directly to another bed in the system for said countercurrent backfilling repressurization of step (a) or for the purging of the bed and/or being passed to a surge tank for subsequent use in such backfilling or purge steps;

(c) passing more readily adsorbable component gas to the feed end of the bed at said upper adsorption pressure so as to cocurrently purge said bed and displace less readily adsorbable component retained in the void spaces thereof, said less readily adsorbable component continuing to be withdrawn from the discharge end of the bed, said withdrawn gas either being passed to said surge tank for subsequent use in backfilling or purge steps, being passed directly to another bed for use in said steps, or being withdrawn from the system, the bed being cleaned out of less readily adsorbable component by said purge prior to the recovery of high purity more readily adsorbable component from the bed;

(d) countercurrently depressurizing the bed by discharging more readily adsorbable component from the feed end of the bed, the pressure of the bed thereby being reduced from the upper adsorption pressure to an intermediate pressure level;

(e) further countercurrently depressurizing the bed by discharging additional quantities of said more readily adsorbable component from the feed end of the bed, the pressure of the bed thereby being reduced from said intermediate pressure to the subatmospheric desorption pressure level;

(f) countercurrently purging the bed by introducing less readily adsorbable component gas to the discharge end of the bed, with additional quantities of the more readily adsorbable component being discharged from the feed end of the bed, thereby increasing the adsorptive capacity of the bed prior to the next succeeding pressurization adsorption step and increasing the sharpness of the mass transfer zone of more readily adsorbable component in the bed, the more readily adsorbable component removed from the feed end of the bed in this step (f) and in countercurrent depressurization steps (d) and (e) being either withdrawn from the system as high purity product gas or stored in a surge tank for use as purge gas in step (c); and (g) repeating steps (a)–(f) on a cyclic basis with additional feed gas being passed to the bed during the carrying out of step (b) therein, whereby, said more readily adsorbable component of the feed gas mixture is conveniently obtained as a high purity, low cost product in said simplified vacuum processing cycle.

2. The process of claim 1 in which said feed gas mixture is air, the more readily adsorbable component comprises nitrogen, and the less readily adsorbable component comprises oxygen.

3. The process of claim 1 in which said adsorption system comprises two adsorbent beds.

4. The process of claim 1 in which said adsorption system comprises three adsorbent beds.

5. The process of claim 1 in which repressurization, less readily adsorbable component withdrawal step (b) comprises (1) initially passing the feed gas mixture to the feed end of the bed to increase the pressure thereof from said intermediate pressure to an upper intermediate pressure, (2) passing additional quantities of said feed gas mixture to the feed end of the bed so as to repressurize the bed from said upper intermediate pressure to the upper adsorption pressure, while simultaneously discharging less readily adsorbable component from the discharge end of the bed, and (3) passing additional quantities of said feed gas mixture to the feed end of the bed at said upper adsorption pressure, while simultaneously discharging additional less readily adsorbable component gas from the discharge end of the bed.

6. The process of claim 1 in which said repressurization, less readily adsorbable component withdrawal of step (b) comprises (1) initially passing the feed gas mixture to the feed end of the bed to increase the pressure thereof from said intermediate pressure to the upper adsorption pressure and (2) passing additional quantities of said feed gas mixture to the feed end of the bed at said upper adsorption pressure, while simultaneously discharging additional less readily adsorbable component gas from the discharge end of the bed.

7. The process of claim 6 in which said adsorption system comprises two adsorbent beds, said feed gas mixture is air, said more readily adsorbable component comprises nitrogen, and said less readily adsorbable component comprises oxygen.

8. The process of claim 7 in which one be is being repressurized from its lower subatmospheric desorption pressure to upper adsorption pressure, with discharge of the less readily adsorbable component from the discharge end of the bed in steps (a), (b) and (c), while the other bed is being depressurized from the upper adsorption pressure to said lower subatmospheric desorption pressure, with recovery of more readily adsorbable component product gas from the feed end of the bed.

9. The process of claim 6 in which said adsorption system comprises three adsorbent beds, said feed gas mixture is air, said more readily adsorbable component comprises nitrogen and said less readily adsorbable component comprises oxygen.

10. The process of claim 9 in which a first bed is being repressurized from its lower subatmospheric desorption pressure to upper adsorption pressure with discharge of less readily adsorbable component from the discharge end of the bed in steps (a) an (b), while a second bed is undergoing further countercurrent depressurization to subatmospheric pressure, countercurrent purge to lower subatmospheric desorption pressure, and backfill to an intermediate pressure level in steps (e) and (f), and the third bed is undergoing copurge at upper adsorption pressure, countercurrent depressurization to an intermediate pressure level, and the initial portion of the further countercurrent depressurization to a subatmospheric pressure level, in steps (c) and (d), with enriched oxygen displaced from the discharge end of the second bed during copurge step (c) therein being used as repressurization gas in step (a) in the first bed, and oxygen withdrawn from the discharge end of the first bed during constant pressure adsorption at upper adsorption pressure in step (b), part (2) thereof being used to provide purge gas for countercurrent purge step (f) in the third bed during which the pressure of said third bed is reduced to said subatmospheric desorption pressure.

11. The process of claim 1 in which said repressurization, less readily adsorbable component withdrawal of step (b) comprises passing said feed gas mixture to the feed end of the bed so as to repressurize the bed from said intermediate pressure to said upper adsorption pressure, while simultaneously discharging less readily adsorbable component from the discharge end of the bed.

12. The process of claim 1 in which said feed gas mixture is passed to the feed end of each bed during step (b) therein, and more readily adsorbable component is likewise passed to the feed end thereof during copurge step (c) using a single time shared blower means for such gas flow steps.

13. The process of claim 1 in which said adsorbent comprises 13X zeolite.

14. The process of claim 1 in which said adsorbent comprises zeolite X having a framework $SiO_2Al_2O_3$ molar ratio of not greater than 3.0, at least about 88% of its $AlO_2$ tetrahedral units being associated with lithium cations.

15. The process of claim 14 in which the framework $SiO_2Al_2O_3$ molar ratio of said zeolite X is from 2.0 to 2.5.

16. The process of claim 15 in which at least 90% of the $AlO_2$ tetrahedral units of the zeolite X are associated with lithium cations.

17. The process of claim 16 in which at least 95% of the $AlO_2$ tetrahedral units of the zeolite X are associated with lithium cations.

18. The process of claim 14 in which said adsorption system comprises two adsorbent beds, the feed gas mixture is air, the more readily adsorbable component comprises nitrogen, and said less readily adsorbable component comprises oxygen.

19. The process of claim 14 in which said adsorption system comprises three adsorbent beds, the feed gas mixture is air, the more eradily adsorbable component comprises nitrogen, and the less readily adsorbable component comprises oxygen.

20. The process of claim 1 in which the passing of the feed gas mixture to the feed end of the bed, in step (b), is initiated upon the beginning of the backfill with the passage of less readily adsorbable component to the discharge end of the bed in step (a), the bed thereby being repressurized simultaneously at both ends thereof.

* * * * *